Jan. 16, 1934.                F. A. HAYES                1,943,527
CONTROLLING MEANS FOR VARIABLE SPEED POWER TRANSMISSION MECHANISMS
                    Filed Oct. 9, 1930            2 Sheets-Sheet 1
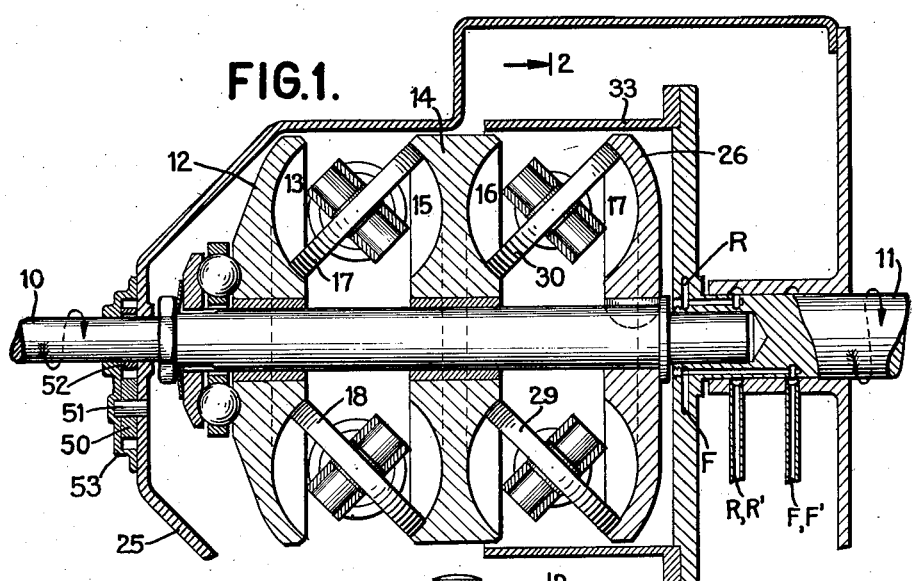
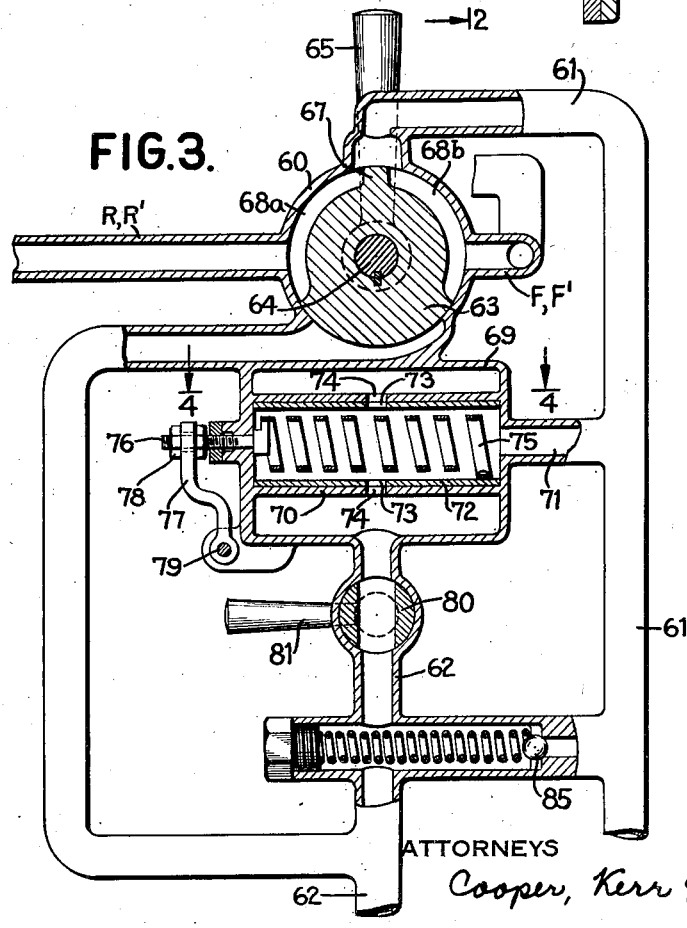
INVENTOR
F.A. HAYES Jan. 16, 1934. F. A. HAYES 1,943,527
CONTROLLING MEANS FOR VARIABLE SPEED POWER TRANSMISSION MECHANISMS
Filed Oct. 9, 1930 2 Sheets-Sheet 2
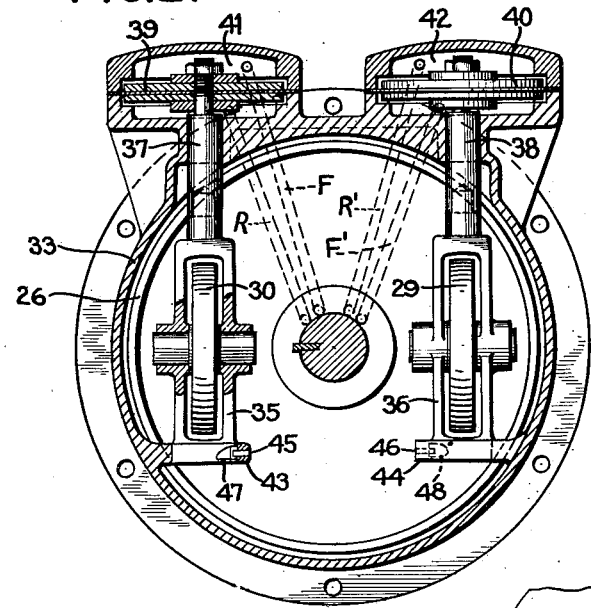
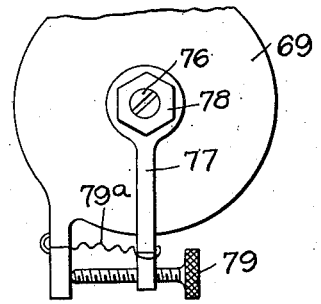
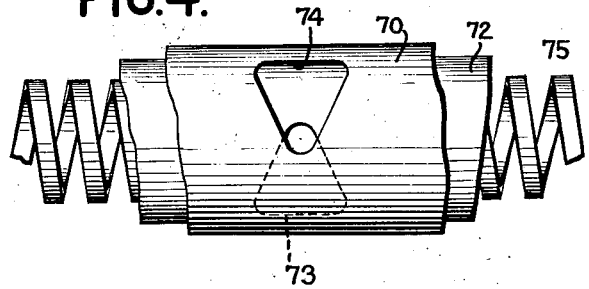
INVENTOR
F.A.HAYES
BY ATTORNEYS Patented Jan. 16, 1934

1,943,527

UNITED STATES PATENT OFFICE 1,943,527

CONTROLLING MEANS FOR VARIABLE SPEED POWER TRANSMISSION MECHANISMS

Frank A. Hayes, Middletown, N. J.

Application October 9, 1930. Serial No. 487,453

4 Claims. (Cl. 60—52)

This invention relates to hydraulic mechanisms, particularly mechanisms which are actuated or controlled by oil or an analogous liquid delivered at a rate which is dependent, at least in part, upon the speed of a driving motor. One example of such mechanisms is a variable speed power transmission mechanism of the friction type for automobiles, in which changes of speed-ratio of the mechanism are brought about by oil or analogous liquid under pressure by a pump which is itself driven by the engine of the car. The chief object of the invention is to provide hydraulic control or actuating mechanism the operation of which will be substantially unaffected by the varying viscosity of the oil, or other equivalent liquid, due to changes in temperature. To this and other ends the invention comprises the novel features and combinations hereinafter described.

In carrying out the invention in the case of an automobile transmission mechanism, I provide, in combination therewith, hydraulic means for bringing about the speed-ratio change or changes by means of oil supplied by a pump or equivalent means at a pressure which varies in suitable correspondence with the speed of the engine; and in connection with the system I provide a by-pass valve by which more or less of the oil delivered by the pump is by-passed around the speed-ratio control means, so that a desired change of speed ratio will be brought about at a higher or lower engine speed, according to the setting of the by-pass valve. This by-pass valve is itself controlled thermostatically, opening as the temperature of the oil decreases and closing as the temperature increases, with the result that as the viscosity of the oil increases the by-passing capacity of the valve will also increase, and vice versa, thus maintaining a desired relation of oil pressure to engine speed. It is then possible to have a given speed-ratio change occur always at the same engine-speed, regardless of what the temperature, and hence the viscosity, of the oil may be.

In the accompanying drawings I have illustrated a convenient and effective form of the invention as embodied in the transmission mechanism described in my prior Patent No. 1,698,229, issued January 8, 1929. It will, however, be evident to those skilled in the art that the invention is not limited to the particular transmission mechanism stated but can be applied with advantage to various other mechanisms.

Referring to the drawings,

Fig. 1 is a sectional plan view of the transmission mechanism, on the plane of the axis of the driving and driven shafts.

Fig. 2 is a cross section on line 2—2 of Fig. 1.

Fig. 3 is a sectional view of the manual and thermostatic valves by which the hydraulic mechanism is controlled.

Fig. 4 is a detail plan view of part of the thermostatic valve mechanism.

Fig. 5 is a detail end view of the thermostatic valve, showing a simple form of tangent screw mechanism for fine adjustment.

In the transmission mechanism shown in the drawings the driving shaft 10, itself driven by the engine (not shown) is journaled in the driven shaft 11 so as to be capable of rotation relative thereto, and has on it a driving disk 12, a disk 14 (loose on the shaft so as to be capable of rotating thereon), and a driving disk 26. These three disks have in their opposed faces toroidal grooves 13, 15, 16 and 17, respectively, and between the disks are two sets of friction wheels or rollers 17, 18, 29, 30, cooperating with the grooves in the disks to transmit power from the driving shaft 10 to the driven shaft 11. Rollers 17, 18 are non-planetary; that is, they rotate on their own axes but do not revolve around the axis of the disks, which, it will be observed, are coaxial with each other. The rollers mentioned may therefore be supported by the housing 25 which encloses the mechanism. Rollers 29, 30, are supported by an overhanging drum which is connected with the driven shaft 11 to drive the same. Hence these rollers are adapted to revolve around the axis of the disks, and for this reason they are termed planetary rollers.

Considering disks 12 and 14 alone, it will be apparent that the speed of disk 14, driven by the disk 12 through the medium of the rollers 17, 18, depends upon the angular position of the rollers relative to the axis of the disks. Thus in the position shown, disk 14 will be rotated at a lower speed than disk 12. As the rollers are turned to parallelism with the axis of the disks, disk 14 will be rotated at the same speed as disk 12, and as they are turned past the parallel position disk 14 will rotate at higher and higher speeds. So, also, the speed at which the planetary rollers revolve around the axis of the disks and the direction of their revolution (and hence the speed and direction of the driven shaft 11) depend upon the angular position of the rollers. Accordingly the ratio of the speed of the driven shaft 11 to the speed of the driving shaft 10, and the direction of rotation of the driven shaft, can be varied by varying the angular position of either or both sets of rollers, the widest range of speed variation being obtained when both sets are adjustable. For the sake of simplicity in the present case it is sufficient to assume that only the rollers of the second or planetary set, 29, 30, are adjustable, the others being set permanently in the parallel position.

To provide for the necessary turning or rocking of the planetary rollers 29, 30 they are mounted in rocking carriers 35, 36, Fig. 2. The latter are threaded in the rods 37, 38 which are secured to diaphragms 39, 40, spanning the chambers 41, 42. The carriers are journaled at their lower ends in bearings 43, 44.

In Fig. 2 the axes of the rollers 29, 30 intersect the axis of the disks, that is, they are coplanar therewith. If oil under pressure is admitted to the top of chamber 41 through duct F and to the bottom of chamber 42 through duct F' carrier 35 will be depressed and carrier 36 raised out of the coplanar relation with the disk axis. As explained in my prior Patent No. 1,698,229 above mentioned, to which reference may be made for a full explanation of the mechanism and its various functions, shifting of the carriers as stated causes the rollers and carriers to rock on the carrier axes, roller 29 rocking counterclockwise and roller 30 clockwise as seen from above in Fig. 2. This rocking movement, which is conveniently termed "precession", continues (with consequent increase of speed ratio) until the rollers reach the limit of such movement, which limit is determined by the pins 45, 46, carried by the bearings 43, 44 and extending into the grooves 47, 48 in the lower ends of the carriers; or until the load on the driven shaft 11 causes the frictional forces exerted upwardly on roller 29 and downwardly on roller 30 to exceed the oil pressure on the diaphragms, whereupon the rollers return to coplanar relation with the disk axis. Here the precession ceases and the speed ratio remains constant.

Oil under pressure may be conveniently supplied by any suitable means, preferably a gear pump driven at the speed of the driving motor or engine. Such a pump is indicated in Fig. 1, and comprises a gear 50, on pin 51, and a gear 52 in mesh with the first and keyed on the engine-driven driving shaft 10. The two gears are enclosed by a cover 53, forming a pump chamber which is connected with the ducts R, R', F, F', through a control valve described below. Oil may be taken by the pump from the bottom of the casing 25 by any suitable connection therewith, not shown.

The control valve mechanism for the oil system may be mounted on the steering column of the automobile or in any other convenient location. In the mechanism illustrated the casing 60 is connected at one side to ducts R, R', and at the other side to ducts F, F'. Between these two connections the casing is connected at the top to pipe 61 and at the bottom to drain pipe 62, the former delivering oil under pressure from the pump 53 and the latter leading back to the sump in the casing 25 from which oil is taken by the pump. Pipe 61 is connected to the high pressure side of the pump. The valve plug 63 is keyed on shaft 64, which is equipped with an operating handle 65. When the plug is in the position shown, the oil pressure is equal on both sides of each diaphragm and hence the rollers remain in the zero speed ratio position shown in Fig. 2. If now the lever 65 is moved to the left, lug 67 closes passage 68a to pipe 61 and opens the same to drain pipe 62, so that if the pressure then exerted through passage 68b on the top of the diaphragm 39 and on the bottom of diaphragm 40 is sufficient to overcome the inertia of the load the rollers will precess (as already described) out of the zero speed ratio position and the car will start. If the pressure is not sufficient, the engine must be speeded up to increase the pressure. If the speed ratio increases too fast to accelerate the car (at the increased engine speed) the load reaction overcomes the oil pressure and the rollers move back to equilibrium position, at which the precession ceases. On the other hand if the engine speed increases or the load resistance decreases, precession continues until the maximum speed ratio position is reached. When an overload occurs and the engine is therefore slowed down the oil pressure is correspondingly decreased and precession toward a lower speed ratio position may then take place, as already explained.

The thermostatic valve comprises a housing 69 across which extends a cylindrical casing 70 connected to pipe 61 by a passage 71, and inside of the casing 70 is a cooperating valve sleeve 72 having upper and lower ports 73 adapted to register with ports 74 in the casing as the sleeve is rotated. Inside the sleeve is a helical thermostatic member 75, connected at one end to the sleeve and at its other end to an adjusting stem 76 provided with an arm 77. Rough adjustment may be effected by turning the stem with a screw driver, first loosening nut 78 (which permits turning the stem in the arm 77), and after tightening the nut a fine adjustment can be effected by means of the tangent screw 79, working in the arm 77, which is urged leftwardly (Fig. 5) by the contractile spring 79a.

In the pipe 62, between the thermostatic valve and the oil sump, is a manual valve 80, having an adjusting handle 81.

Evidently the engine speed necessary to develop enough pressure to cause precession of the rollers to the highest speed ratio position or to maintain the rollers in a given speed ratio position depends upon two factors: (a) the amount of oil "wasted" by being by-passed through passage 71 and drain pipe 62 back to the sump, and (b) the resistance of the load tending to slow down the engine. Since the oil wasted depends upon the setting of the thermostatic valve, it will be seen that as this valve is closed less is wasted and more is delivered to the diaphragm chambers and hence a lower engine speed will maintain the necessary pressure on the diaphragms. This means that with the rollers in the maximum speed ratio position a comparatively low engine speed may be sufficient to keep them there. Suppose, for example, that with valve 66 at a given setting an engine speed of 500 R. P. M. is sufficient to maintain the rollers in the maximum speed ratio position and that a speed of 2500 R. P. M. will then drive the car at fifty miles per hour. The car, traveling at the velocity just stated, starts to ascend a grade. If the throttle is kept at the same opening the car will slow down, and with it the engine, but the car must slow down to less than ten miles per hour before the decreasing engine speed reaches the value at which the oil pressure falls to a point which will permit the rollers to precess to a lower speed ratio position. In short, at ten miles per hour and all higher speeds the transmission mechanism remains in the maximum speed ratio position. But if this is true when the oil is cold and therefore thick and slow-running, it would not be true when the oil is hot and therefore thin and free-flowing, except for the action of the heat-responsive member 75, which, as the oil in which it is bathed warms up, expands and rotates the sleeve 72 (clockwise as seen from the left) thereby restricting the ports 74 in casing 70. Similarly, as the oil cools off, the sleeve is turned in the other direction, thus opening the ports. By proper shaping of the ports, with due regard to the effect of temperature on the oil and the extent of rotation of the sleeve per unit of temperature change, the changing viscosity of the oil can be compensated for over any desired range of temperature.

The valve 80 gives the operator easy control of the mechanism within the limits imposed by the setting of the thermostatic valve. Suppose, for example, that the latter valve is set to give maximum speed ratio at an engine speed corresponding to a car velocity of ten miles per hour. If the operator wants the transmission mechanism to take the maximum position at less than the engine speed referred to, he simply adjusts the valve to a position at which its capacity will be enough less than that of the thermostatic valve to give the result desired. It will be observed, however, that opening the valve 80 can not increase the capacity of the thermostatic valve and hence the operator can not, by adjustment of the valve 80 alone, raise the critical speed which the engine must attain before the high speed ratio can be brought about. This critical value can be increased only by adjusting the thermostatic valve. The net result is that the engine can not be driven at high speed of the crankshaft and low speed ratio of the transmission mechanism, and the engine therefore can not be abused by racing it at high speed, as can be done with the conventional sliding gear transmission by keeping the gears in low or second speed. In short the thermostatic valve limits to a predetermined value the speed which the engine can attain without the transmission mechanism going automatically into a high speed ratio.

Reverting to the manual valve 63, when the control handle is thrown to the right the lug 67 opens passage 68b to the drain pipe 62 and closes the same to the pressure supply pipe 61. The oil pressure then exerted through passage 68a and ducts R. R' can cause the rollers 29, 30 to precess from the zero speed ratio position into "reverse".

The ball check valve 85 is provided as a safety valve. If the pressure in pipe 61 and the diaphragm should for any reason rise above a safe maximum the valve will open and relieve the pressure.

It is to be understood that the invention is not limited to the specific structure herein specifically illustrated and described but can be embodied in other forms without departure from its spirit.

I claim—

1. In a variable speed power transmission mechanism having a driving element and a driven element, in combination, oil-actuated means for producing a change of speed ratio between the driving element and the driven element, means for delivering oil from a source thereof to the oil-actuated means at a pressure dependent upon the speed of a driving engine connected with the driving element to increase the speed ratio of the mechanism as the engine speed increases, means for by-passing a part of the oil back to the oil source, temperature-responsive means cooperating with the oil by-passing means to vary the capacity of said by-passing means in accordance with the temperature of the oil, and operator-operable means in series with the temperature-responsive means to decrease the total amount of oil by-passed.

2. In a variable speed power transmission mechanism having a driving element and a driven element, in combination, oil-actuated means for producing a change of speed ratio between the driving element and the driven element, a pump adapted to deliver oil from a source thereof at a pressure dependent upon the speed of a driving engine connected with the driving element to increase the speed ratio of the mechanism as the engine speed increases, a pipe connecting the pump and the oil-actuated means to supply oil to the latter, a valve connected with said pipe for returning a part of the oil therefrom to the source, thermostatic means cooperating with the valve to adjust the same in compensation for change of viscosity due to temperature variations, and an operator-operable control valve in series with the thermostatically controlled valve between the same and the oil source.

3. In a variable speed power transmission mechanism having a driving element and a driven element, in combination, oil-actuated means for producing a change of speed ratio between the driving element and the driven element, means for delivering oil from a source thereof to the oil-actuated means at a pressure dependent upon the speed of a driving engine connected with the driving element, means for by-passing a part of the oil back to the oil source, and temperature-responsive means cooperating with the oil by-passing means to vary the capacity of said by-passing means in accordance with the temperature of the oil, and a manually adjustable valve in series with the said oil by-passing means to decrease the amount of oil by-passed thereby.

4. In a variable speed power transmission mechanism having a driving element and a driven element, in combination, oil-actuated means for producing a change of speed ratio between the driving element and the driven element, a pump adapted to deliver oil from a source thereof at a pressure dependent upon the speed of a driving engine connected with the driving element, a pipe connecting the pump and the oil-actuated means to supply oil to the latter, a valve connected with said pipe for returning a part of the oil therefrom to the source, thermostatic means cooperating with the valve to adjust the same in compensation for change of viscosity due to temperature variations, and a manually adjustable valve in series with said oil-returning valve to decrease the amount of oil returned thereby.

FRANK A. HAYES.